United States Patent
An et al.

(10) Patent No.: US 10,428,247 B2
(45) Date of Patent: Oct. 1, 2019

(54) ADHESIVE COMPOSITION FOR TOUCH SENSOR AND OPTICAL LAMINATE USING THE SAME

(71) Applicant: DONGWOO FINE-CHEM CO., LTD., Iksan-si, Jeollabuk-do (KR)

(72) Inventors: Myungyoung An, Incheon (KR); Sungwoo Yu, Seoul (KR); Han Young Choi, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 31 days.

(21) Appl. No.: 15/810,771

(22) Filed: Nov. 13, 2017

(65) Prior Publication Data

US 2018/0134930 A1    May 17, 2018

(30) Foreign Application Priority Data

Nov. 16, 2016 (KR) .................. 10-2016-0152654

(51) Int. Cl.
| | |
|---|---|
| *C09J 133/04* | (2006.01) |
| *C09J 11/04* | (2006.01) |
| *C09J 11/06* | (2006.01) |
| *B32B 7/12* | (2006.01) |
| *C08K 5/521* | (2006.01) |

(Continued)

(52) U.S. Cl.
CPC .............. *C09J 133/10* (2013.01); *B32B 7/12* (2013.01); *C08K 5/0025* (2013.01); *C08K 5/521* (2013.01); *C08K 5/5317* (2013.01); *C08K 5/56* (2013.01); *C09J 7/20* (2018.01); *C09J 9/00* (2013.01); *C09J 11/04* (2013.01); *C09J 11/06* (2013.01); *C09J 133/00* (2013.01); *C09J 133/04* (2013.01); *G06F 3/044* (2013.01); *C08K 5/524* (2013.01); *C09J 2203/326* (2013.01); *C09J 2205/114* (2013.01); *C09J 2433/00* (2013.01); *G06F 2203/04102* (2013.01); *G06F 2203/04103* (2013.01); *G06F 2203/04111* (2013.01)

(58) Field of Classification Search
CPC ........ C09J 4/00; C09J 11/06; C09J 2203/326; C08K 5/56; C08K 5/521; C08K 5/5317; C08K 5/5333
See application file for complete search history.

(56) References Cited

U.S. PATENT DOCUMENTS

| | | | | |
|---|---|---|---|---|
| 2011/0304571 | A1* | 12/2011 | Kim | .................... G02F 1/13338 345/173 |
| 2012/0306812 | A1* | 12/2012 | Lai | ........................ G06F 3/0412 345/174 |

FOREIGN PATENT DOCUMENTS

| | | | |
|---|---|---|---|
| JP | 2014056122 A | * | 3/2014 |
| KR | 10-1586739 B1 | | 1/2016 |

OTHER PUBLICATIONS

Machine translation of JP 2014-056122A (Year: 2014).*

* cited by examiner

*Primary Examiner* — Ramsey Zacharia
(74) *Attorney, Agent, or Firm* — Sughrue Mion, PLLC

(57) ABSTRACT

The present invention provides an adhesive composition for a touch sensor comprising: a photopolymerizable compound a titanocene-based compound as a photoinitiator; and a phosphoric acid-based compound or a phosphonic acid-based compound as a curing accelerator. The adhesive composition for a touch sensor according to the present invention can exhibit corrosion resistance to a touch sensor while directly attaching a touch sensor on a UV-impermeable substrate, and thereby it can be effectively used for attaching a touch sensor on various substrates.

15 Claims, 1 Drawing Sheet

(51) Int. Cl.
*C08K 5/5317* (2006.01)
*C09J 133/10* (2006.01)
*C09J 9/00* (2006.01)
*G06F 3/044* (2006.01)
*C09J 7/20* (2018.01)
*C08K 5/00* (2006.01)
*C08K 5/56* (2006.01)
*C09J 133/00* (2006.01)
*C08K 5/524* (2006.01)

[FIG. 1]
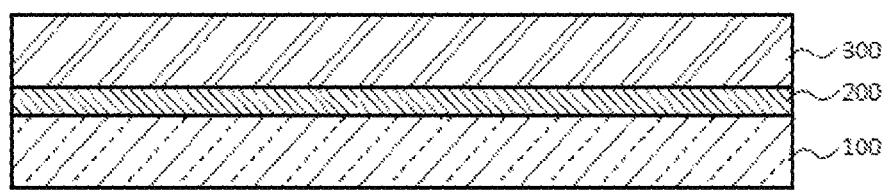
[FIG. 2]
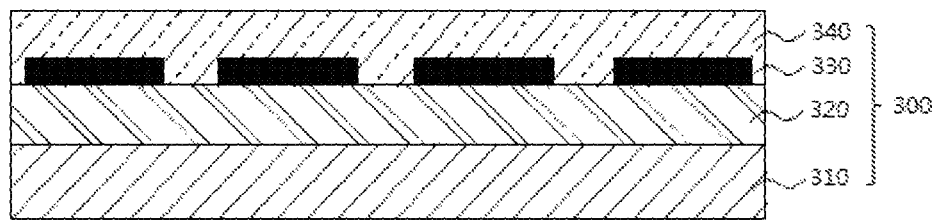

ADHESIVE COMPOSITION FOR TOUCH SENSOR AND OPTICAL LAMINATE USING THE SAME

CROSS REFERENCE TO RELATED APPLICATIONS

This application claims priority based on Korean Patent Application No. 10-2016-0152654, filed Nov. 16, 2016, the content of which is incorporated herein by reference in its entirety.

TECHNICAL FIELD

The present invention relates to an adhesive composition for a touch sensor and an optical laminate using the same. More particularly, the present invention relates to an adhesive composition for a touch sensor capable of directly attaching a touch sensor to a UV impermeable substrate and exhibiting corrosion resistance to a touch sensor, and an optical laminate using the same.

BACKGROUND ART

As the touch input method is in the spotlight as a next generation input method, attempts have been made to introduce a touch input method into a wider variety of electronic devices. Accordingly, research and development on a touch sensor capable of being applied to various environments and accurately recognizing a touch are actively conducted.

For example, in the case of an electronic device having a touch-type display, an ultra-thin flexible display which achieves ultra-light weight and low power and has improved portability has been attracting attention as a next-generation display, and development of a touch sensor applicable to such display has been required.

Flexible display means a display fabricated on a flexible substrate that can be warped, bended or rolled without loss of properties, and technological development in the form of flexible LCD, flexible OLED and electronic paper is under way.

In order to apply the touch input method to such flexible display, a touch sensor having excellent warpage and restoration force and having superior flexibility and stretchability is required.

As for the touch sensor for producing such flexible display, a wiring board including a metal wiring buried in a transparent resin substrate has been proposed. For example, a transfer-based touch sensor in which a separation layer is formed on a carrier substrate to proceed with a process, and a separation layer is used as a metal wiring coating layer when separated from the carrier substrate has been proposed (see Korean Patent No. 10-1586739).

Such a transfer-based touch sensor can be attached and applied on various substrates. However, when such substrate is a UV-impermeable substrate, it is impossible to perform adhesion with an existing UV-curable adhesive. Further, since the transfer-based touch sensor includes components that are easily corroded by acid like metal wiring, an adhesive composition having corrosion resistance is required.

Accordingly, there is a need to develop techniques for an adhesive composition which can exhibit corrosion resistance to a touch sensor while directly attaching a touch sensor such as a transfer-based touch sensor on a UV-impermeable substrate.

DISCLOSURE

Technical Problem

It is an object of the present invention to provide an adhesive composition which can exhibit corrosion resistance to a touch sensor while directly attaching a touch sensor on a UV-impermeable substrate.

It is another object of the present invention to provide an optical laminate formed using the adhesive composition.

Technical Solution

In accordance with one aspect of the present invention, there is provided an adhesive composition for a touch sensor comprising: a photopolymerizable compound; a titanocene-based compound as a photoinitiator; and a phosphoric acid-based compound or a phosphonic acid-based compound as a curing accelerator.

In one embodiment of the present invention, the phosphoric acid-based compound may be a compound represented by the following chemical formula 1.

[Chemical Formula 1]

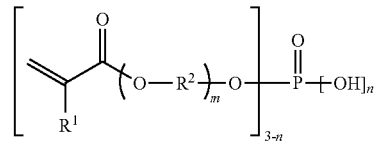

wherein,
$R^1$ is hydrogen or methyl group,
$R^2$ is $C_1$-$C_6$ alkylene group,
n is an integer of 1 to 3, and
m is an integer of 1 to 10.

In one embodiment of the present invention, the phosphonic acid-based compound may be a compound represented by the following chemical formula 2.

[Chemical Formula 2]

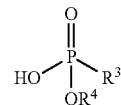

wherein,
$R^3$ is $C_1$-$C_6$ alkyl group or aryl group, and
$R^4$ is hydrogen, $C_1$-$C_6$ alkyl group or aryl group.

On the other hand, the present invention provides an optical laminate comprising: a substrate; an adhesive layer formed of the adhesive composition laminated on the substrate; and a touch sensor laminated on the adhesive layer.

In one embodiment of the present invention, the touch sensor may include a separation layer, an electrode pattern layer formed on the separation layer; and an insulating layer formed on the top of the electrode pattern layer and formed to cover the electrode pattern layer.

Advantageous Effects

The adhesive composition for a touch sensor according to the present invention can exhibit corrosion resistance to a touch sensor while directly attaching a touch sensor on a UV-impermeable substrate using a visible light, and thereby it can be effectively used for attaching a touch sensor on various substrates.

BRIEF DESCRIPTION OF DRAWINGS

FIG. 1 is a structural cross-sectional view of an optical laminate according to an embodiment of the present invention.

FIG. 2 is a structural cross-sectional view of a touch sensor included in an optical laminate according to an embodiment of the present invention.

BEST MODE

Hereinafter, the present invention will be described in more detail.

One embodiment of the present invention relates to an adhesive composition for a touch sensor comprising: a photopolymerizable compound; a titanocene-based compounds as a photoinitiator, and a phosphoric acid-based compound or a phosphonic acid-based compound as a curing accelerator.

In one embodiment of the present invention, the photopolymerizable compound may include 1 to 6 functional monomers, and specifically includes monofunctional monomers such as methyl (meth)acrylate, allyl methacrylate, 2-ethoxyethyl (meth) acrylate, isodecyl (meth)acrylate, 2-dodecylthioethyl methacrylate, octylacrylate, 2-methoxyethyl acrylate, hydroxyethyl (meth)acrylate, hydroxypropyl (meth)acrylate, hydroxybutyl (meth)acrylate, isooctyl (meth)acrylate, stearyl (meth)acrylate, glycidyl (meth)acrylate, tetrafurfuryl (meth)acrylate, phenoxyethyl (meth)acrylate, urethane acrylate, aminoethyl (meth)acrylate, dimethylaminoethyl (meth)acrylate; bifunctional monomers such as 1,3-butanediol di(meth)acrylate, 1,4-butanediol di(meth)acrylate, 1,6-hexanediol di(meth)acrylate, ethylene glycol di(meth)acrylate, bisphenol A-ethylene glycol diacrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, bis(2-hydroxyethyl)isocyanurate di(meth) acrylate, di(acryloxyethyl) isocyanurate, allylated cyclohexyl di(meth)acrylate, dimethyloldicyclopentane diacrylate, ethylene oxide-modified hexahydrophthalic acid diacrylate, tricyclodecane dimethanol diacrylate, neopentyl glycol-modified trimethylolpropane diacrylate, and adamantane diacrylate; trifunctional monomers such as trimethylolpropane tri(meth)acrylate, dipentaerythritol tri(meth)acrylate, propionic acid-modified dipentaerythritol tri(meth) acrylate, pentaerythritol tri(meth)acrylate, propylene oxide-modified trimethylolpropane tri(meth)acrylate, tris(2-hydroxyethyl) isocyanurate tri(meth)acrylate, tris (acryloxyethyl) isocyanurate and glycerol tri(meth)acrylate; tetrafunctional monomers such as diglycerin tetra(meth) acrylate, pentaerythritol tetra(meth)acrylate, and ditrimethylolpropane tetra(meth)acrylate, pentafunctional monomers such as propionic acid-modified dipentaerythritol penta(meth)acrylate, and hexafunctional monomers such as caprolactone-modified dipentaerythritol hexa(meth)acrylate. Of these, monofunctional to trifunctional monomers are preferred. These may be used alone or in combination of two or more.

In one embodiment of the present invention, the titanocene-based compound is a visible light type photoinitiator having an initiating wavelength of a visible light range of 400 to 600 nm, and has properties of photo-initiating by absorbing the wavelength of the visible light, and so it is particularly advantageous for the adhesion between the touch sensor and the UV-impermeable substrate.

In general, as the adhesive used for attaching UV-impermeable substrates, there are two types of adhesives, namely, a thermal initiation type adhesive and a visible light initiation type adhesive. Among them, the thermal initiation type adhesive including a thermal initiator is mainly used, but the thermal initiation type adhesive is slow in reaction rate and releases $N_2$ gas or $CO_2$ gas, which is not suitable for applying to a touch sensor.

Meanwhile, the visible light initiation type adhesive is mainly used for dentistry, and is used for attaching UV-impermeable substrates by curing a dental resin with a photosensitizer such as 1,2-phenylpropanedione or camphorquinone, and a visible light initiator such as a tertiary amine, e.g., 4-(dimethylamino)ethyl methacrylate (AEM). However, since the tertiary amine is very sensitive to visible light, the handling property is greatly deteriorated, and since its odor is bad, it is difficult to use in large quantities. Further, since it is low in photosensitivity, it should be used in admixture with a photosensitizer having an absorption wavelength of 393 to 468 nm like the above-mentioned photosensitizer.

However, since the titanocene-based compound used in the present invention has an absorption wavelength in the range of 405 to 500 nm, no additional photosensitizer is needed, and since the reaction rate is high as a photoinitiator and the processability is superior, it can be applied directly to existing UV bonding process, without using a crimping device or the like, as compared with a thermal initiator.

The titanocene-based compound may be used without limitation as long as it is used in the relevant art. Specifically, as the titanocene-based compound, at least one selected from the group consisting of bis(cyclopentadienyl)-bisphenyl titanium, bis(cyclopentadienyl)-bis(2,3,4,5,6-pentafluorophenyl) titanium, bis(cyclopentadienyl)-bis(2,3,5,6-tetrafluorophenyl) titanium, bis(cyclopentadienyl)-bis(2,4,6-trifluorophenyl) titanium, bis(cyclopentadienyl)-bis(2,6-difluorophenyl) titanium, bis(cyclopentadienyl)-bis(2,4-difluorophenyl) titanium, bis(methylcyclopentadienyl)-bis(2,3,4,5,6-pentafluorophenyl) titanium, bis(methylcyclopentadienyl)-bis(2,3,5,6-tetrafluorophenyl) titanium bis(methylcyclopentadienyl)-bis(2,6-difluorophenyl) titanium, bis(cyclopentadienyl)-bis(2,6-difluoro-3-(pyrrol-1-yl)phenyl) titanium, bis(cyclopentadienyl)-bis(2, 4,6-trifluoro-3-(pyrrol-1-yl)phenyl) titanium, and bis (cyclopentadienyl)-bis(2,4,6-trifluoro-3-(2,5-dimethylpyrrol-1-yl)phenyl) titanium can be used, and particularly, bis(cyclopentadienyl)-bis(2,6-difluoro-3-(pyrrol-1-yl)phenyl) titanium can be used.

The titanocene-based compound can be contained in an amount of 0.01 to 10 parts by weight based on 100 parts by weight of the photopolymerizable compound. When the amount of the titanocene-based compound is less than 0.01 part by weight. It may be difficult to effectively initiate radical photopolymerization. When the amount of the titanocene-based compound is more than 10 parts by weight, the residual initiator may adversely affect the stability of the adhesive. Because of the nature of the initiator which absorbs visible light, it has a color and thus there is a possibility of discoloring the color of the touch sensor.

In one embodiment of the present invention, the phosphoric acid-based compound or the phosphonic acid-based compound accelerates radical photopolymerization by the titanocene-based compound as a curing accelerator thereby effectively initiating photopolymerization even at low illuminance. Further, it is adsorbed on the electrode portion of the touch sensor to improve corrosion resistance, and suppress the color development of the adhesive composition due to visible light absorption of the titanocene-based compound.

The phosphoric acid-based compound is not particularly limited as long as it is a compound containing a phosphoric acid functional group. For example, the phosphoric acid-based compound may be a compound represented by the following chemical formula 1.

[Chemical Formula 1]

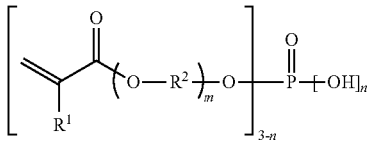

wherein,
$R^1$ is hydrogen or methyl group,
$R^2$ is $C_1$-$C_6$ alkylene group,
n is an integer of 1 to 3, and
m is an integer of 1 to 10.

The $C_1$-$C_6$ alkylene group as used herein refers to a linear or branched divalent hydrocarbon having 1 to 6 carbon atoms, and examples thereof include methylene, ethylene, propylene, isopropylene, butylene, and the like, but are not limited thereto.

In one embodiment of the present invention, $R^2$ is isopropylene group, and n may be 2.

In one embodiment of the present invention, n may be 3.

The phosphonic acid-based compound may be used without limitation as long as it is a compound containing a phosphonic acid functional group. For example, the phosphonic acid-based compound may be a compound represented by the following chemical formula 2.

[Chemical Formula 2]

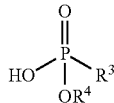

wherein,
$R^3$ is $C_1$-$C_6$ alkyl group or aryl group, and
$R^4$ is hydrogen, $C_1$-$C_6$ alkyl group or aryl group.

The $C_1$-$C_6$ alkyl group as used herein refers to a linear or branched monovalent hydrocarbon having 1 to 6 carbon atoms, and examples thereof include methyl, ethyl, n-propyl, i-propyl, n-butyl, i-butyl, t-butyl, n-pentyl, n-hexyl, and the like, but are not limited thereto.

The aryl group as used herein includes all of aromatic groups, heteroaromatic groups, or partially reduced derivatives thereof. The aromatic group means a 5 to 15-membered simple or fused ring, and the heteroaromatic group means an aromatic group containing at least one atom selected from oxygen, sulfur and nitrogen. Representative examples of the aryl group include phenyl, naphthyl, pyridinyl, furanyl, thiophenyl, indolyl, quinolinyl, imidazolinyl, oxazolyl, thiazolyl, tetrahydronaphthyl, etc., but are not limited thereto.

In the $C_1$-$C_6$ alkyl group and the aryl group, at least one hydrogen may be substituted by $C_1$-$C_6$ alkyl group, $C_2$-$C_6$ alkenyl group, $C_2$-$C_6$ alkynyl group, $C_3$-$C_{10}$ cycloalkyl group, $C_3$-$C_{10}$ heterocycloalkyl group, $C_3$-$C_{10}$ heterocycloalkyloxy group, $C_1$-$C_6$ haloalkyl group, $C_1$-$C_6$ alkoxy group, $C_1$-$C_6$ thioalkoxy group, aryl group, acyl group, hydroxy, thio, halogen, amino, alkoxycarbonyl, carboxy, carbamoyl, cyano, nitro, or the like.

In one embodiment of the present invention, $R^3$ is benzyl, fluorobenzyl, cyanobenzyl, nitrobenzyl, phenyl, fluorophenyl, cyanophenyl or nitrophenyl, and $R^4$ may be hydrogen.

The phosphoric acid-based compound or the phosphonic acid-based compound may be contained in an amount of 0.01 to 10 parts by weight based on 100 parts by weight of the photopolymerizable compound. When the amount of the phosphoric acid-based compound or the phosphonic acid-based compound is less than 0.01 part by weight, the initiator may not be sufficiently initiated and thus there may be a drawback that the adhesion strength is lowered due to undercuring. If the amount of the phosphoric acid-based compound or the phosphonic acid-based compound is more than 10 parts by weight, there may be drawbacks of lowering the adhesion strength and lowering corrosion resistance.

The adhesive composition according to an embodiment of the present invention may further include at least one antioxidant or the like known in the relevant art as needed.

Referring to FIG. 1, one embodiment of the present invention relates to an optical laminate comprising, a substrate 100, an adhesive layer 200 formed of the adhesive composition laminated on the substrate, and a touch sensor 300 laminated on the adhesive layer.

The optical laminate according to one embodiment of the present invention can be produced by, for example, a coating step of coating the adhesive composition of the present invention onto a touch sensor in an uncured condition to form an adhesive-coated surface, an attaching step of attaching the substrate to the adhesive-coated surface, and a curing step of curing the adhesive composition.

There is no particular limitation on the method of coating the adhesive composition onto the touch sensor, and various coating methods such as a doctor blade, a wire bar, a die coater, a comma coater, a gravure coater and the like can be used.

After the adhesive composition of the present invention is coated onto the touch sensor, the substrate is attached to the adhesive-coated surface and then the adhesive composition is cured by the irradiation of active energy rays to fix a touch sensor on the substrate.

The light source of the active energy ray is not particularly limited, but an active energy ray having a light emission distribution with a wavelength of 400 to 600 nm is preferred. Specifically, the irradiation amount of light can be about 0.01 to 10 J/cm$^2$, more specifically 0.1 to 2 J/cm$^2$.

The thickness of the adhesive layer 200 can be adjusted according to the adhesion strength, and is preferably 0.1 to 10 μm more preferably 0.1 to 5 μm.

In one embodiment of the present invention, the adhesive layer may exhibit an adhesion force of at least 2 N/25 mm, for example 2 to 10 N/25 mm with respect to the substrate, and the reaction termination time after photoinitiation may be within 2 minutes.

Further, the adhesive layer may have a color change rate of within Δ±0.5.

In one embodiment of the present invention, the substrate 100 to be attached to the touch sensor 300 by the adhesive layer 200 can be used without limitation as long as it is a ultraviolet (UV) impermeable substrate in which a transmittance of visible light of 400 to 600 nm is 50% or more. For example, the substrate may be a polarizing plate or a polyimide film.

Further, the touch sensor 300 forms a separation layer on a carrier substrate to proceed with a touch sensor forming process, and it may be a touch sensor that causes the separation layer to be used as a wiring covering layer when separated from the carrier substrate. For example, the touch sensor 300 may be a film touch sensor having a film shape.

Specifically, the touch sensor 300 may include a separation layer 310, an electrode pattern layer 330 formed on the separation layer; and an insulating layer 340 formed on the top of the electrode pattern layer and formed to cover the electrode pattern layer, as shown in FIG. 2.

The separation layer 310 is a polymer organic film, which is coated on a carrier substrate, and an electrode pattern layer or the like is formed thereon. Then the separation layer is finally separated from the carrier substrate.

The peeling force of the separation layer 310 is preferably 1 N/25 mm or less, and more preferably 0.1 N/25 mm or less. In other words, it is desirable that the separation layer 310 is formed of a material such that the physical force applied when separating the separation layer 310 from the carrier substrate does not exceed 1 N/25 mm, especially 0.1 N/25 mm.

When the separating layer 310 has a peeling force of more than 1 N/25 mm, the separation layer 310 may remain on the carrier substrate without being separated clearly at the time of separation from the carrier substrate. Further, there is a possibility that cracks occur at any point of the separation layer 310, the protective layer 320, the electrode pattern layer 330, and the insulating layer 340.

Particularly, the peeling force of the separation layer 310 is more preferably 0.1 N/25 mm or less. When it is 0.1 N/25 mm or less, it is more preferable in that curls can be controlled after peeling from the carrier substrate. The curls do not cause any problem in terms of the function of the touch sensor, but may reduce the efficiency of the processes such as a bonding process and a cutting process, and thus it is advantageous to minimally cause curls.

Further, the thickness of the separation layer 310 is preferably 10 to 1000 nm, more preferably 50 to 500 nm. If the thickness of the separation layer 310 is less than 10 nm, the uniformity at the time of coating the separation layer is deteriorated so that the electrode pattern may be unevenly formed, the peeling force locally increases so that tearing is generated, or curls are not controlled in the touch sensor after separated from the carrier substrate. When the thickness exceeds 1000 nm, there is a problem that the peeling force is no longer lowered, and that the flexibility is lowered.

An electrode pattern layer 330 is formed on the top of the separation layer 310. After the separation layer 310 is separated from the carrier substrate, it functions as a coating layer for covering the electrode pattern layer 330 or as a protective layer for protecting the electrode pattern layer 330 from external contact.

At least one protective layer 320 can be further formed on the top of the separation layer 310. Since it may be difficult to protect the electrode pattern against external contacts and impact with only the separation layer 310, at least one protective layer 320 may be formed on the separation layer 310.

The protective layer 320 includes at least one of an organic insulating film or an inorganic insulating film and can be formed through a coating and curing method or vapor deposition.

An electrode pattern layer 330 is formed on the top of the separation layer 310 or the protective layer 320. The electrode pattern layer 330 is configured to include a sensing electrode for sensing the touch and a pad electrode formed at one end of the sensing electrode. Here, the sensing electrode may include not only an electrode for sensing a touch but also a wiring pattern connected to the electrode.

The electrode pattern layer 330 is a transparent conductive layer and may be formed of at least one material selected from metals, metal nanowires, metal oxides, carbon nanotubes, graphenes, conductive polymers, and conductive inks.

The pattern structure of the electrode pattern layer is preferably an electrode pattern structure used in the electrostatic capacity method, and mutual-capacitance method or self-capacitance method may be applied.

In the case of mutual-capacitance method, it may be a lattice electrode structure having a horizontal axis and a vertical axis. Bridge electrodes may be formed at the intersections of the electrodes on the horizontal axis and the vertical axis, or the horizontal axis electrode pattern layer and the vertical axis electrode pattern layer may be formed respectively and electrically separated from each other.

In the case of a self-capacitance method, it may be an electrode layer structure in which changes in capacitance are read using one electrode at each point.

An insulating layer 340 is formed on the top of the electrode pattern layer 330. The insulating layer can prevent corrosion of the electrode pattern and serve to protect the surface of the electrode pattern. It is preferable that the insulating layer 340 is formed to have a constant thickness by filling the gap between the electrodes or the wiring. That is, it is preferable that the surface opposite to the surface in contact with the electrode pattern layer 330 is formed flat so that irregularities of the electrode are not exposed.

The insulating layer is not particularly limited as long as it is an organic insulating material, but it is preferably a thermosetting or UV curable organic polymer.

In the touch sensor, the pad electrode can be electrically connected to the circuit board. The circuit board may include, for example, a flexible printed circuit board (FPCB) and has a function of electrically connecting the touch control circuit and the touch sensor.

The optical laminate according to an embodiment of the present invention may have a form in which the separation layer 310 of the touch sensor 300 is attached to the adhesive layer 200.

Hereinafter, the present invention will be described in more detail with reference to examples, comparative examples and experimental examples. It should be apparent to those skilled in the art that these examples, comparative examples and experimental examples are for illustrative purposes only, and the scope of the present invention is not limited thereto.

Examples 1 to 4 and Comparative Examples 1 and 2: Preparation of Adhesive Composition An adhesive composition was prepared by mixing the components with the composition shown in Table 1 below (unit: parts by weight)

TABLE 1

|  |  | Example 1 | Example 2 | Example 3 | Example 4 | Comparative Example 1 | Comparative Example 2 |
|---|---|---|---|---|---|---|---|
| Photopolymerizable compound | | 100 | 100 | 100 | 100 | 100 | 100 |
| Photoinitiator | Titanocene-based compound | 0.8 | 0.1 | 0.5 | 1 | — | 1 |
| | Bisacylphosphine oxide-based compound | — | — | — | — | 1 | — |
| Curing accelerator | phosphoric acid-based compound 1 | 1.2 | — | — | — | — | — |
| | phosphoric acid-based compound 2 | — | 2.9 | — | — | — | — |
| | phosphoric acid-based compound 3 | — | — | 9.5 | — | — | — |
| | Phosphonic acid-based compound 1 | — | — | — | 0.9 | — | — |
| | Carboxylic acid-based compound | — | — | — | — | — | 14 |

Photopolymerizable compound: A mixture of 30 parts by weight of 2-ethylhexyl acrylate (EHA), 30 parts by weight of methacrylate (MA), 10 parts by weight of 2-hydroxyethyl acrylate (HEA) and 30 parts by weight of isobornyl acrylate Titanocene-based compound: Irgacure 784 (BASF)

Bisacylphosphine oxide-based compound: bis(2,4,6-trimethylbenzoyl) phenylphosphine oxide, TPO (CIBA)

Phosphoric acid-based compound 1 Phosphoric acid

Phosphoric acid-based compound 2: Sipomer PAM-200 (Rhodia)

Phosphoric acid-based compound 3: Bis[2-(methacryloyloxy)ethyl]phosphate

Phosphonic acid-based compound 1: (4-nitrobenzyl) phosphonic acid

Carboxylic acid-based compound: carboxyethyl acrylate (CEA)

Experimental Example 1

The adhesive compositions prepared in Examples and Comparative Examples were coated onto one side of a touch sensor to form an adhesive layer in a thickness of 2.1 μm. Then. UV-impermeable polyimide film (UPILEX-25S, Ube Industries, Ltd.) was laminated on the adhesive layer and then cured at a light quantity of 1200 mJ/cm² using a high pressure mercury lamp to produce an optical laminate.

The physical properties of the produced optical laminate were measured by a method described below, and the results are shown in Table 2 below.

(1) Adhesion Strength

The optical laminates prepared in Examples and Comparative Examples were cut to a width of 25 mm and a length of 100 mm to prepare specimens. The specimens were peeled off at a rate of 300 mm/min at 180 degrees of the peel direction to measure the adhesion strength (N/25 mm).

(2) Durability (Heat Resistance, Moist Heat Resistance)

The durability including heat resistance and moist heat resistance was evaluated for the optical laminates prepared in Examples and Comparative Examples. The heat resistance property was evaluated by observing the occurrence of bubbles or peeling after being left at a temperature of 90° C. for 500 hours. The moist heat resistance property was evaluated by observing the occurrence of bubbles or peeling after being left under conditions of 85° C. and 85% RH for 500 hours.

<Evaluation Criteria>
⊚: No bubble or peeling
◯. Bubbles or peeling<5
Δ: 5≤Bubbles or peeling<10
X: 10≤Bubbles or peeling (3) Corrosion Resistance The indium tin oxide electrode pattern portion of the optical laminates prepared in Examples and Comparative Examples was left for 500 hours under the conditions of 85° C. and 85% RH (moist heat resistance condition), and then the rising rate of the electric resistance value of the indium tin oxide layer was measured and the corrosion resistance was evaluated according to the following evaluation criteria.

$$\text{Rising rate of electric resistance value (\%)} = ((R2-R1)/R1) \times 100 \quad \text{[Equation 1]}$$

In the Equation 1, R1 is an initial electric resistance value, and R2 is an electric resistance value after being left for 500 hours.

<Evaluation Criteria>
◯: Rising rate of electric resistance value of less than 5%
Δ: Rising rate of electric resistance value from 5% or more to less than 10%
x: Rising rate of electric resistance value of 10% or more (4) Color Change Rate Using the CM-700D manufactured by Konica Minolta, the color coordinates a* and b* of the optical laminates prepared in Examples and Comparative Examples were measured on the side of the substrate before and after the coating of the adhesive. The rate of change in color coordinates before and after the coating of the adhesive was measured according to Equation 2, and the rate of color change was evaluated based on the following evaluation criteria.

$$\Delta a^* \text{ rate of change in color coordinate (\%)} = ((A2-A1)/A1) \times 100$$

$$\Delta b^* \text{ rate of change in color coordinate (\%)} = ((B2-B1)/B1) \times 100 \quad \text{[Equation 2]}$$

In the Equation 2, A1 is the initial color coordinate of a*, A2 is the color coordinate of a* after being left for 500 hours, B1 is the initial color coordinate of b*, and B2 is the color coordinate of b* after being left for 500 hours.

<Evaluation Criteria>
⊚: $(\Delta a^* + \Delta b^*)/2 \leq 1$
◯: $1 < (\Delta a^* + \Delta b^*)/2 \leq 2.5$
Δ: $2.5 < (\Delta a^* + \Delta b^*)/2 \leq 5$
X: $5 < (\Delta a^* + \Delta b^*)/2$

TABLE 2

| Category | Adhesion strength (N/25 mm) | Durability | | | Color change rate |
|---|---|---|---|---|---|
| | | Heat resistance | Moist heat resistance | Corrosion resistance | |
| Example 1 | 3.61 | ○ | ○ | ○ | ○ |
| Example 2 | 4.1 | ○ | ○ | ○ | ◎ |
| Example 3 | 2.46 | ○ | ○ | Δ | ○ |
| Example 4 | 3.49 | ○ | ○ | ○ | ○ |
| Comparative Example 1 | 0.08 | X | X | ○ | ○ |
| Comparative Example 2 | 4.52 | ○ | Δ | X | ○ |

As shown in Table 2, it was confirmed that the adhesive compositions of Examples 1 to 4 according to the present invention not only provide stronger adhesion between the UV-impermeable substrate and the touch sensor but also have excellent durability as compared with the adhesive composition of Comparative Example 1. Also, it was confirmed that the rates of color change of the adhesive compositions of Examples 1 to 4 were low. Further, it was confirmed that the adhesive compositions of Examples 1 to 4 according to the present invention were excellent in corrosion resistance as compared with Comparative Example 2 using a carboxylic acid-based compound as a curing accelerator.

Although particular embodiments of the present invention have been shown and described in detail, it will be obvious to those skilled in the art that these specific techniques are merely preferred embodiments and the scope of the invention is not limited thereto. It will be understood by those skilled in the art that various changes and modifications may be made to the invention without departing from the spirit and scope of the invention.

The substantial scope of the present invention, therefore, is to be defined by the appended claims and equivalents thereof.

DESCRIPTION OF REFERENCE NUMERALS

100: Substrate
200: Adhesive layer
300: Touch sensor
310: Separation layer
320: Protective layer
330: Electrode pattern layer
340: Insulating layer

The invention claimed is:

1. An adhesive composition for a touch sensor comprising: a photopolymerizable compound; a titanocene-based compound as a photoinitiator; and a phosphoric acid-based compound or a phosphonic acid-based compound as a curing accelerator,
wherein the phosphoric acid-based compound is a compound of the following Chemical Formula 1:

Chemical Formula 1

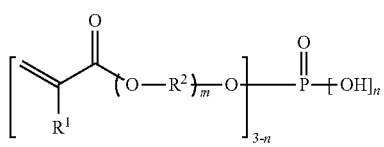

wherein
$R^1$ is hydrogen or methyl group,
$R^2$ is a $C_1$-$C_6$ alkylene group,
n is an integer of 1 to 3, and
m is an integer of 1 to 10; and
wherein the phosphonic acid-based compound is a compound of the following Chemical Formula 2:

Chemical Formula 2

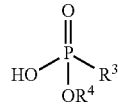

wherein
$R^3$ is a $C_1$-$C_6$ alkyl group or an aryl group, and
$R^4$ is hydrogen, a $C_1$-$C_6$ alkyl group, or an aryl group.

2. The adhesive composition of claim 1, wherein the titanocene-based compound is at least one selected from the group consisting of bis(cyclopentadienyl)-bisphenyl titanium, bis(cyclopentadienyl)-bis(2,3,4,5,6-pentafluorophenyl) titanium, bis(cyclopentadienyl)-bis(2,3,5,6-tetrafluorophenyl) titanium, bis(cyclopentadienyl)-bis(2,4,6-trifluorophenyl) titanium, bis(cyclopentadienyl)-bis(2,6-difluorophenyl) titanium, bis(cyclopentadienyl)-bis(2,4-difluorophenyl) titanium, bis(methylcyclopentadienyl)-bis(2,3,4,5,6-pentafluorophenyl) titanium, bis(methylcyclopentadienyl)-bis(2,3,5,6-tetrafluorophenyl) titanium, bis(methylcyclopentadienyl)-bis(2,6-difluorophenyl) titanium, bis(cyclopentadienyl)-bis(2,6-difluoro-3-(pyrrol-1-yl)phenyl) titanium, bis(cyclopentadienyl)-bis(2,4,6-trifluoro-3-(pyrrol-1-yl)phenyl) titanium, and bis(cyclopentadienyl)-bis(2,4,6-trifluoro-3-(2,5-dimethylpyrrol-1-yl)phenyl) titanium.

3. The adhesive composition of claim 1, wherein $R^2$ is isopropylene group, and n is 2.

4. The adhesive composition of claim 1, wherein n is 3.

5. The adhesive composition of claim 1, wherein $R^3$ is benzyl, fluorobenzyl, cyanobenzyl, nitrobenzyl, phenyl, fluorophenyl, cyanophenyl, or nitrophenyl, and $R^4$ is hydrogen.

6. The adhesive composition of claim 1, wherein the titanocene-based compound is contained in an amount of 0.01 to 10 parts by weight based on 100 parts by weight of the photopolymerizable compound.

7. The adhesive composition of claim 1, wherein the phosphoric acid-based compound or the phosphonic acid-based compound is contained in an amount of 0.01 to 10 parts by weight based on 100 parts by weight of the photopolymerizable compound.

8. An optical laminate comprising:
a substrate;
an adhesive layer formed of the adhesive composition of claim 1 laminated on the substrate; and
a touch sensor laminated on the adhesive layer.

9. The optical laminate of claim 8, wherein the substrate is UV-impermeable.

10. The optical laminate of claim 8, wherein the substrate is a polarizing plate or a polyimide film.

11. The optical laminate of claim 8, wherein the touch sensor includes:
a separation layer;
an electrode pattern layer formed on the separation layer; and
an insulating layer formed on the top of the electrode pattern layer and formed to cover the electrode pattern layer.

12. The optical laminate of claim 11, wherein the touch sensor further includes a protective layer formed between the separation layer and the electrode pattern layer.

13. An optical laminate comprising:
a substrate;
an adhesive layer formed of the adhesive composition of claim 2 laminated on the substrate; and
a touch sensor laminated on the adhesive layer.

14. An optical laminate comprising:
a substrate;
an adhesive layer formed of the adhesive composition of claim 6 laminated on the substrate; and
a touch sensor laminated on the adhesive layer.

15. An optical laminate comprising:
a substrate;
an adhesive layer formed of the adhesive composition of claim 7 laminated on the substrate; and
a touch sensor laminated on the adhesive layer.

* * * * *